Aug. 6, 1968     J. G. CAMPBELL ET AL     3,395,486
FLOWER POT
Original Filed May 6, 1965
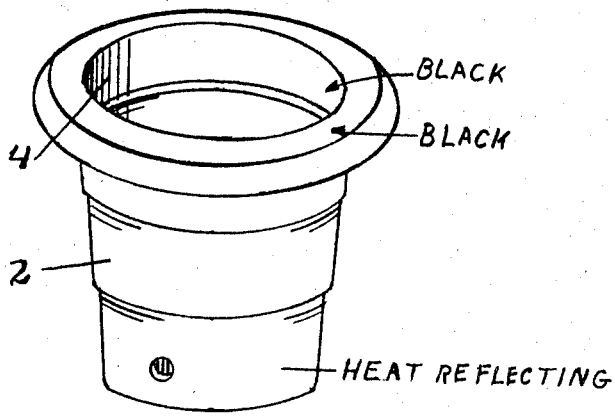
Fig. 1
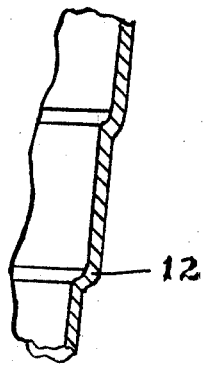
Fig. 2
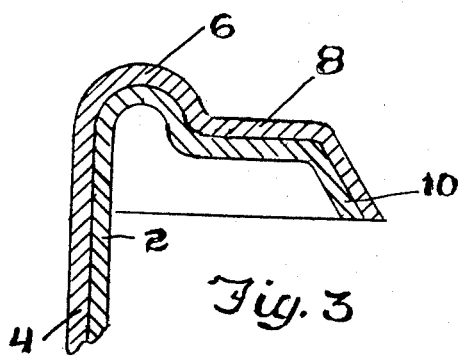
Fig. 3
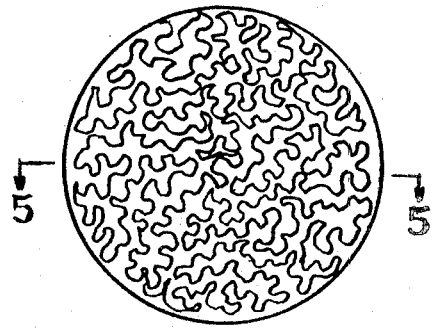
Fig. 4
Fig. 5
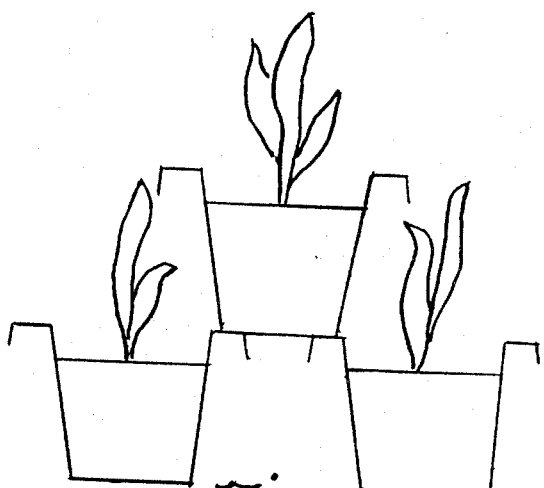
Fig. 6
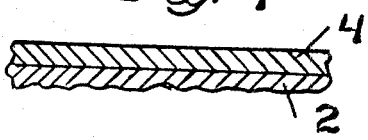
INVENTORS
JAMES G. CAMPBELL
ROBERT LURIE
BY
Bailey, Stephens & Huettig
ATTORNEYS

United States Patent Office 3,395,486
Patented Aug. 6, 1968

3,395,486
FLOWER POT
James G. Campbell and Robert Lurie, Jacksonville, Fla.; said Campbell assignor to Campbell-Lurie Plastics, Inc., Jacksonville, Fla.
Continuation of application Ser. No. 453,702, May 6, 1965. This application Oct. 28, 1966, Ser. No. 590,440
7 Claims. (Cl. 47—34)

This application is a continuation of application Ser. No. 453,702, filed May 6, 1965, and now abandoned.

The invention relates to flower pots, and particularly to such pots which are formed of plastic material.

It has been found that the roots of plants being grown in pots, particularly in greenhouses, grow more quickly if the soil in which they are planted is kept cool and dark. One object of the present invention is to provide an inexpensive and lightweight construction of a flower pot which will keep the soil within it both cooler and darker than conventional pots, whether of plastic or metal.

Likewise, it has been found that most plastic pots, when exposed to sun and weather, deteriorate fairly rapidly, with the result that the earth may fall out, or that the pot cannot be reused.

A further object of the invention is to provide a flower pot which is more durable under outdoor conditions.

Most plastic pots, especially those of large size, are relatively flexible, so that, when they are picked up by an edge of the top opening, they sag into an oval shape, with the result that the soil around the roots is disturbed, particularly if it is sandy or loamy, and the roots are disturbed. This often results in a setback in growth or even in the loss of the plant.

The present invention contemplates the provision, around the upper edge of the pot, of a flange or rim which both reinforces and rigidifies the pot and also provides a convenient handhold for picking up the pot with one hand. It further contemplates the fact that the upper face of this flange is made of a material resistant to sun and weather, thus substantially increasing the life of the pot.

Pots so reinforced are also capable of being stacked in zig-zag fashion, as will be explained below, so that a larger number of potted plants can be stored or shipped on a given amount of floor space.

Many commercial users of plastic pots, most of which have horizontal grooves pressed into the wall, complain that the roots stick to the plastic. It has been found, in general, that actually the roots grow into or beneath such grooves and lock the plant in the pot, requiring disturbance of the root growth for its removal. The present invention has as one of its features a construction which facilitates the removal of the rooted plant from the pot without disturbing the root system.

Still another object of the invention is to construct the bottom of the pot in such a way as to adhere more firmly to the ground than normal pots, so that potted plants standing in the open are not as likely to be upset by high winds.

Basically, the invention contemplates a pot formed of two sheets of solid plastic material laminated together, the inner sheet being opaque (preferably black) and the outer sheet being of a material which reflects heat rays.

This has the advantage that it is unnecessary to make the outer layer completely opaque, which would require either the use of an excessive amount of pigment or the use of an unnecessarily thick sheet when the strength of the pot is considered. This outer layer reflects the heat, but permits some light to pass through. The black inner layer however stops substantially all the light and prevents it from reaching the soil around the roots. On the other hand, the black inner layer does not absorb any substantial amount of heat because this is reflected by the outer layer.

Likewise, the black layer is more weather resistant than a green, white or transparent layer. Bending this layer outwardly at the top edge to form a handling rim not only stiffens the pot but, because the black layer is on top and receives most of the exposure to the sun and weather, the life of the pot is substantially increased.

The lamination of two sheets of solid plastic (as contrasted with foam plastic) has been found to give a product of greater stiffness than a pot with a wall of the same thickness formed of a single sheet.

Further objects and advantages of the invention will appear more fully from the following description, particularly when taken in conjunction with the accompanying drawings which form a part thereof.

In the drawings:

FIG. 1 is a perspective of a flower pot embodying the inventions;

FIG. 2 is a cross-section through the wall of the pot through a single lamina;

FIG. 3 is a cross-section on an enlarged scale through the rim section of the pot;

FIG. 4 is a bottom view;

FIG. 5 is a partial cross-section on the line 5—5 of FIG. 4; and

FIG. 6 shows the mode of stacking the pots.

Referring to the drawings, the pot indicated generally in FIG. 1 includes an outer layer 2 and an inner layer 4, both of solid polyethylene, these being bonded together. The inner layer 4 is opaque, preferably pigmented black. The outer layer 2 is of a light reflecting material, being preferably white. However, some colors which are not completely white will likewise reflect heat to a substantial degree, and, since many persons prefer green flower pots, the white outer layer may be tinted with green.

In any event, the outer layer should be of a nature which will reflect a substantial proportion of the heat rays which strike the pot.

The total thickness of the walls of the pot is approximately 0.040 inch, the inner layer being about 0.025 inch and the outer layer 0.015 inch. Thicknesses may vary, however, as long as each layer is thick enough to accomplish its function and the combined layers have the needed structural strength. The pots are produced by a suction process, the laminated sheets being drawn up into recesses in a die and then cut loose from the sheet.

The walls can be made relatively thin, so that the pot is light and inexpensive, while the black inner layer prevents light which passes through the outer layer from reaching the earth within the pot.

As is shown especially in FIG. 3, the laminated plastic sheets are bent out at the top edge to form a rim. This rim has an inner portion 6 of semi-toroidal shape, a substantially flat part 8 and a downwardly turned outer edge portion 10. This rim is designed not only to provide a means of carrying the pot, but also to add stiffness to the container. The inner black liner which forms the exposed upper surface of the rim is resistant to the degrading effects of sunlight, or, in other words, this resistant liner covers and protects the exposed side of the rim.

The stiffness is thus added to the top rim without the use of costly metal inserts which rust when attacked by a fertilizer. This rusting causes the metal rim to become loose and the pot is completely worthless.

The laminating together of interior and exterior sheets gives a stiffer container. When a container is not stiff, in lifting it and moving it, it flexes badly, and the root system is disturbed and pockets of air develop between the root system which hinder the growth and beauty of the plants.

It will further be noted, as shown in FIGS. 1 and 2, that the inside wall face has, from the bottom upward, successive outwardly stepped portions 12 joining successive frustoconical portions. This allows the plant to come out easily and the roots not to stick to the interior ribbing, as they do on other pots.

Many conventional pots have vertical ribs along the side walls to get the strength, as well as circular ribs around the circumference. These ribs have been found to cause roots to become entrapped within such ribs and prevent easy removal of the plant from the can and develop a condition which the trade refers to as the plant is "sticking to the plastic."

In contrast, a smooth wall interior with our stepped outline and with the stiffness developed by the laminating technique, allows easy plant removal without tearing or disturbing the root system.

FIGS. 4 and 5 show that the bottom surface of the pot has a crinkled or uneven surface. This crinkle finish on the bottom of the container causes the container to hug the earth to minimize the danger of the plant's falling over on a windy field.

The lamination of the black interior which blocks out light is advantageous since no light gets to the roots of the plants. The present container does not become brittle and thus has a longer life than other pots when exposed to the degrading effect of the sun's rays and outdoor exposure in excess of one year. This longer life and freedom from brittleness is a result of the black interior. In contrast, a container such as a solid green container or other colors, when exposed to the sun's rays and weathering, becomes brittle. The black interior develops its long life through the action of its carbon black content which is compounded into the plastic. The lamination of this black interior to a green exterior keeps the entire container useful and in one piece against the action of the sun's tendency to degrade and embrittle. The exterior can be other colors than green.

An all black pot attracts too much heat. Too much heat is bad for the root system in which what is known as "root burn-out" develops. Also, an all black pot has no sales appeal to a home owner.

FIG. 6 shows how the pots may be stacked, when filled with plants, to allow more of them to be carried on the floor of a truck or the like.

While we have described herein one embodiment of our invention, we wish it to be understood that we do not intend to limit ourselves thereby except within the scope of the claims hereto or hereinafter appended.

We claim:
1. A flower pot having a wall composed of two thin laminated sheets of thin solid plastic material, the inner sheet being opaque and the outer sheet being heat-reflective, and having an outstanding flange around its upper edge, the upper surfaces of said flange being formed by a part of said opaque sheet.
2. A flower pot as claimed in claim 1, in which said outer sheet contains a white pigment.
3. A flower pot as claimed in claim 2, in which the inner sheet contains a black pigment.
4. A flower pot as claimed in claim 1, in which said flange has a downwardly turned outer edge, the outer face of said outer edge being formed by a part of said opaque sheet.
5. A flower pot as claimed in claim 1, in which said flange includes an inner part of semitoroidal cross-shape, a main substantially flat portion and a downwardly turned outer edge, the upper faces of the semitoroidal and main portions and the outer face of said outer edge being formed by a part of said opaque sheet.
6. A flower pot as claimed in claim 1, having a flat bottom wall, the lower face of said bottom wall being crinkled.
7. In a flower pot as claimed in claim 1, the inner surface of the side wall comprising a plurality of successive frustoconical sections each increasing upwardly in cross-section, the lower edge of each section having a greater diameter than the upper edge of the next lower section and being connected thereto by a step.

References Cited

UNITED STATES PATENTS

| | | | |
|---|---|---|---|
| 2,836,318 | 5/1958 | Pinsky et al. | 215—1 |
| 3,009,603 | 11/1961 | Stockdale | 220—97 |

ABRAHAM G. STONE, *Primary Examiner.*

P. RAZZANO, *Assistant Examiner.*